US010853155B2

(12) United States Patent
Loukissas et al.

(10) Patent No.: US 10,853,155 B2
(45) Date of Patent: Dec. 1, 2020

(54) FORWARDING METADATA PROXY SERVER FOR ASYNCHRONOUS METADATA OPERATIONS

(71) Applicant: EMC IP Holding Company LLC, Hopkinton, MA (US)

(72) Inventors: Alexander Loukissas, Santa Monica, CA (US); Vaibhav Kamra, Sunnyvale, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/518,873

(22) Filed: Jul. 22, 2019

(65) Prior Publication Data

US 2019/0347147 A1 Nov. 14, 2019

Related U.S. Application Data

(63) Continuation of application No. 15/499,696, filed on Apr. 27, 2017, now Pat. No. 10,402,241.

(51) Int. Cl.
*G06F 9/54* (2006.01)
*H04L 29/06* (2006.01)

(52) U.S. Cl.
CPC .............. *G06F 9/547* (2013.01); *H04L 67/40* (2013.01)

(58) Field of Classification Search
CPC ....................................................... G06F 9/547
See application file for complete search history.

(56) References Cited

U.S. PATENT DOCUMENTS

| | | | |
|---|---|---|---|
| 8,615,562 B1 | 12/2013 | Huang | |
| 2010/0132024 A1 | 5/2010 | Ben-Natan | |
| 2013/0041872 A1 | 2/2013 | Aizman | |
| 2015/0280959 A1* | 10/2015 | Vincent | H04L 67/1097 709/203 |
| 2015/0378619 A1 | 12/2015 | Maeda | |
| 2016/0352588 A1 | 12/2016 | Subbarayan | |
| 2017/0272301 A1 | 9/2017 | Lepeska | |
| 2017/0317974 A1 | 11/2017 | Masurekar | |

OTHER PUBLICATIONS

U.S. Appl. No. 15/499,696, filed Apr. 27, 2017, Loukissas, et al.
Lieflander, G., “Distributed Systems 5 RFC” (2009), pp. 1-92 [retrieved from https://os.itec.kit.edu/downloads/DS5_RPCClientServer.pdf].
U.S. Appl. No. 15/499,696, Oct. 4, 2018, Office Action.
U.S. Appl. No. 15/499,696, May 17, 2019, Notice of Allowance.

* cited by examiner

*Primary Examiner* — Brian W Wathen
(74) *Attorney, Agent, or Firm* — Workman Nydegger

(57) ABSTRACT

In one example, a method is performed by a client agent and includes receiving a metadata request from an application, generating a remote procedure call (RPC) that identifies metadata requested by the application, transmitting the RPC to a metadata server (MDS) proxy, receiving, from the MDS proxy, an acknowledgement that the RPC has been received and logged, receiving metadata identified in the RPC, and providing the metadata to the application.

20 Claims, 2 Drawing Sheets

FORWARDING METADATA PROXY SERVER FOR ASYNCHRONOUS METADATA OPERATIONS

RELATED APPLICATIONS

This application is a continuation of, and hereby claims priority to, U.S. patent application Ser. No. 15/499,696, entitled FORWARDING METADATA PROXY SERVER FOR ASYNCHRONOUS METADATA OPERATIONS, and filed Apr. 27, 2017. All of the aforementioned applications are incorporated herein in their respective entireties by this reference.

FIELD OF THE INVENTION

Embodiments of the present invention generally concern the performance of operations that require the use of metadata, as well as metadata operations. More particularly, at least some embodiments of the invention relate to systems, hardware, computer-readable media, and methods directed to a metadata proxy server, client agent, and associated metadata operations.

BACKGROUND

Entities typically generate and use data that is important in some way to their operations. This data can include, for example, business data, financial data, and personnel data. Accordingly, entities typically back up their important data so as to create a backup that can later be used in a data restore process if necessary. In some cases, entities use an off-premises platform, such as a cloud storage platform, for storage of the backup data. Processes such as reading, writing, and searching can be performed with respect to the stored backup data, and these processes may involve the use of a client agent, and a metadata server (MDS) which can serve as a namespace provider for the system such that all file system operations are satisfied by a request from the client agent to the MDS.

While arrangements such as the client agent/MDS arrangement noted above have proven satisfactory in some regards, problems nonetheless remain. For example, processing a file system request typically incurs a 'roundtrip' between the client agent that generates the file system request and the MDS which services the file system request, since the client agent and MDS may be geographically separated from each other. This roundtrip often accounts for the majority of the latency perceived at the client side for a given file system request.

In light of the perceived latency problem, what is needed is an architecture that may provide for a reduction in the latency of metadata operations perceived by the client agent, on a per metadata operation basis, but which also maintains correctness in the file system.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
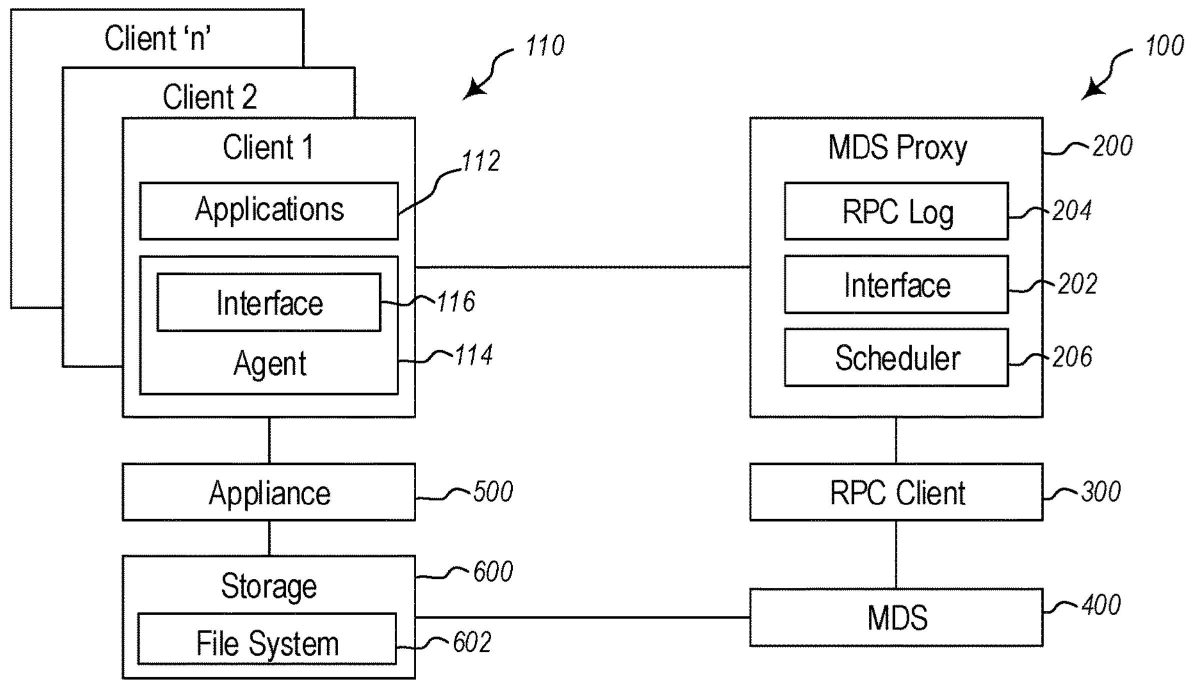
FIG. 1 discloses aspects of an example architecture for at least some embodiments.

Embodiments of the present invention generally concern the performance of metadata operations, such as create new file, rename, delete, and query file attributes, for example. Such metadata operations can be performed in connection with backup and restore processes, although the scope of the invention is not limited to those example processes. More particularly, at least some embodiments of the invention relate to systems, hardware, computer-readable media, and methods directed to a metadata proxy server and associated filesystem operations.

Embodiments of the invention can be employed in a variety of environments, including data storage environments, such as, but not limited to, cloud storage environments, public/private clouds, and/or on-premises storage environments, for example, and any other environments where backup and/or restore operations, or portions of such backup and/or restore operations, are performed. The scope of the invention is not limited to any particular storage environment however, nor to use in connection with a storage environment. As well, components of the storage environment, including, but not limited to, a client agent and MDS proxy, may be geographically distributed in such a way that they are physically and/or logically separated from each other.

Client data that is to be backed up and/or restored may be distributed across one or more storage environments and/or across different portions of a single storage environment. As well, embodiments of the invention may be employed in conjunction with backup and/or restore processes and associated applications, including backup and restore applications and associated backup and restore clients. These, and/or other backup and restore applications and clients may comprise, or consist of, data deduplication functions and processes and, as such, embodiments of the invention may be employed in connection with data deduplication processes and associated data deduplication file systems (FS), although that is not required.

Processes such as reading, writing, and searching can be performed with respect to the stored backup data, and these processes may involve the use of a client agent, and a metadata server (MDS) which can serve as a namespace provider for the system such that all file system operations are satisfied by a request from the client agent to the MDS. In at least some embodiments, the client agent is physically and logically separate from the MDS, but the client agent may be physically and/or logically co-located with an MDS proxy, discussed below.

As noted above, one component of an example system within the scope of the invention is the metadata server (MDS). This is the authoritative namespace provider in the system, and all file system operations are satisfied by a request to the MDS. Another component of the system is the client agent. In general, the client agent exposes a file system interface to applications and is responsible for propagating file system requests received by an application to the MDS via a remote procedure call (RPC) that is used to call a procedure, or function, on a remote machine such as the MDS. Such procedures can comprise, or consist of, operations such as create new file, rename, delete, and query file attributes, for example. The client agent and MDS may communicate directly and/or indirectly with each other. In the latter case, the client agent and MDS may communicate with each other by way of one or more intervening hardware and/or software entities.

Processing a file system request from the client agent incurs a roundtrip communication between the client agent and the MDS. That is, the client agent must transmit a communication to the MDS, and the MDS must transmit a responsive communication back to the client agent. Thus, two different communications are involved in the roundtrip communication. In light of this, and because the client agent and MDS may be physically separated from each other, the roundtrip communication can account for the majority of the perceived latency per requested file system operation, that is, per each file system request made by the client agent. Thus, another component of example embodiments of an architecture within the scope of the invention is an MDS proxy.

In more detail, since the RPCs received by the MDS proxy from the client agent need to be forwarded to the MDS, example embodiments of the architecture include another component, namely, an RPC client. In some embodiments at least, the RPC client may behave exactly like an RPC component of the client agent, maintaining a connection/session with the MDS. The MDS proxy forwards all incoming RPCs to the RPC client, which itself forwards them to the MDS. The reverse path is taken for the response from the MDS back to the client agent.

Operationally, for every RPC that the client agent needs to send to the MDS, the client agent has enough information/state to decide whether this operation request is safe to be sent asynchronously to the MDS. Where the client agent determines that the operation request can be safely transmitted asynchronously, the client agent indicates this to the MDS proxy, which in turn does the following: (1) record the incoming RPC in a "pending" RPCs log; (2) reply instantly, or nearly so, to the client agent; and, (3) schedule the RPC to be forwarded to the MDS for servicing. Among other things, the MDS can, in response to an RPC from a client agent, send metadata back to the client agent that indicates, for example, where data requested by an application is located in storage and/or metadata that indicates where data generated by the application can be stored in storage. More generally, the MDS can transmit metadata to the client agent that concerns metadata operations such as create new file, rename, delete, and query file attributes, for example.

Since the client agent does not need to wait until the RPC has been sent to the MDS and a response received from the MDS, the perceived latency in the metadata operation is simply the latency between the client agent and the MDS proxy. In general, this latency is shorter than what would be experienced in an architecture without an MDS proxy, that is, an architecture in which the client agent communicates directly with the MDS instead of by way of an MDS proxy. The following example is illustrative.

For example, and as disclosed herein, when a metadata operation enters a system in a default case, the path that the metadata operation takes involves a round-trip communication to the server, such as the MDS, as well as server processing time. In this case, as disclosed herein, this trip can be essentially short-circuited by almost instantly returning a response to the application, which in turn reduces the "perceived latency" of the metadata operation to the application/user.

For the sake of comparison, a hypothetical communication might look like this:

application↔magfs client↔[RPC over LAN/WAN]↔ MDS (where the illustrative example of 'magfs' is a storage system produced by EMC Corporation).

By comparison, a communication according to an example embodiment of the invention might look like this:

application↔magfs client↔enqueue asynchronous MDS proxy (almost instantaneous).

Advantageously then, example embodiments of the invention may reduce the perceived latency for each requested metadata operation while maintaining correctness in the file system. In more detail, the client agent supports asynchronous metadata operations and is able to propagate, through use of the MDS proxy, all pending metadata operations to the MDS. By including this functionality in a well-provisioned component, that is, the MDS proxy, embodiments of the invention can enable better handling of error cases.

By way of comparison, such results would likely not be obtained if the MDS proxy functionality were to be included, for example, in a client agent, since a client agent may fail to propagate pending metadata operations for various reasons, such as a network partition, or software crash, for example. As well, the MDS proxy has relatively more resources and may be better controlled and monitored than arbitrary client devices and agents.

Embodiments of the invention may provide other advantages as well. For example, by leveraging embodiments of the disclosed architecture, metadata workloads that involve intensive use of metadata operations would benefit, and especially so in a geographically distributed workforce use case. For example, at least some embodiments of the disclosed architecture may allow the perceived, by the client agent, latency per metadata operation to decrease from tens, or even hundreds, of milliseconds to only a few milliseconds for the roundtrip time between the client agent and the MDS proxy, assuming negligible processing/queueing delays at the MDS proxy itself.

Finally, it should be noted that while this disclosure refers to various advantages that may be achieved by some embodiments of the invention, none of such advantages are necessarily provided by, or required of, any particular embodiment(s). Thus, yet other embodiments may provide none of these advantages, or may provide alternative advantages.

A. Example Architecture

In general, embodiments of the invention may include and/or be implemented in a data protection system operating environment that includes one or more storage systems or storage environments, various client systems and devices that generate data and perform, and/or request performance of, operations with respect to backed up data, such as search, read, and write operations. Such operations can be performed in connection with one or more data backup and/or data restore processes, and can be associated with one or more metadata operations, such as create new file, rename, delete, and query file attributes, for example.

Thus, processes such as are disclosed herein may, but are not required to, be performed by a backup and restore application, which can be hosted on a server, that communicates directly or indirectly with one or more clients that generate and transmit read and write requests, although other applications could alternatively be employed. More generally, embodiments of the invention can be employed in connection with metadata processes associated with any type of application, and the scope of the invention is not limited for use with backup and restore applications. The backup and restore application may also communicate, directly or indirectly, with storage and/or storage servers in order to service client read and write requests directed to the storage and/or storage servers. Corresponding metadata operation requests such as create new file, rename, delete, and query file attributes, for example, can be generated and transmitted by a client agent that communicates with an MDS proxy.

Example storage environments with which embodiments of the invention may be employed may take the form of a cloud storage environment, an on-premises storage environment, and hybrid storage environments that include public and private elements, although the scope of the invention extends to any other type of storage environment as well. In some embodiments, the storage environment can include a cloud based object store, such as Amazon S3, Microsoft Azure, Google Cloud Storage, a private object store, and/or a hybrid object store. An MDS can be used to manage access to the data in such object stores. More generally, embodiments of the invention can be implemented in any suitable environment and the scope of the invention is not limited to the example environments and components disclosed herein.

Any of the devices, including the clients, in the operating environment can be physical machines or virtual machines (VM), though neither type of machine is required for any embodiment. Similarly, data protection system components such as databases, storage servers, backup servers, and restore servers, for example, can likewise take the form of physical machines or virtual machines (VM), though neither type of machine is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files, contacts, directories, sub-directories, volumes, and any group of one or more of the foregoing.

Some example embodiments of the invention will be described with reference to a data storage system in the form of a storage system configured to store files, but it should be understood that the principles of the disclosure are not limited to this configuration. Rather, they are applicable to any system capable of storing and handling various types of objects, in analog, digital, or other form. Although terms such as document, file, or object may be used by way of example, the principles of the disclosure are not limited to any particular form of representing and storing data or other information. Rather, such principles are equally applicable to any object capable of representing information.

With reference now to FIG. 1, an example architecture 100 is disclosed that includes one or more clients 110, each of which can be any general purpose computing device, one example of which is discussed in FIG. 2 below. For example, one or more of the clients 110 may be a personal computer, workstation, handheld computer, smart phone, and/or tablet computer. The clients 110 may include applications 112 that generate, and/or cause the generation of, data that is desired to be backed, and later restored if necessary to the clients 110. To this end, the clients 110 may each include an instance of a client agent 114 that participates in backup and/or restore operations, and the performance of query or search operations.

The client agent 114 can include an interface 116 that is presented to the applications 112 and is responsible for propagating file system requests received by an application 112 to an MDS proxy 200 by way of an RPC. Correspondingly, the MDS proxy 200 may include an interface 202 by way of which the MDS proxy 200 is able to communicate with an RPC client 300. The RPC client 300, in turn, communicates with the MDS 400, discussed below. In some embodiments, the RPC client 300 can be co-located physically and/or logically with the MDS proxy 200 while, in yet other embodiments, the RPC client 300 can be co-located physically and/or logically with the MDS 400.

The MDS proxy 200 exposes the interface 202 to the client agent 114, and communicates with the client agent 114 by way of that interface 202. The MDS proxy 200 may be referred to herein as a 'terminating proxy,' and the MDS proxy 200 is capable of understanding a communication protocol used for communications between the client agent 114 and the MDS 400. As well, the MDS proxy 200 is able to decode the incoming RPCs received from the client agent 114. In at least some embodiments, the MDS proxy 200 and client agent 114 may be co-located such that there is relatively low latency in communications passing between those two entities. For example, and while shown separately from the client 110 in FIG. 1, the MDS proxy 200 can physically and/or logically reside at the client 110. As well, the MDS proxy 200 is able to take the appropriate action based on a request received from the client agent 114. As discussed in more detail elsewhere herein, such actions could include, for example, blocking the request from the client agent 114 until the MDS 400 responds, or returning a reply to the client agent 114 immediately, and queueing the request from the client agent 114 using a scheduler 206, discussed in more detail below.

In addition to the interface 202, the MDS proxy 200 may also include an where incoming RPCs from a client 110 are stored as 'pending' RPCs. A scheduler 206 may also be provided as an element of the MDS proxy 200. In general, the scheduler 206 determines when a particular RPC will be transmitted to the MDS 400 by way of the RPC client 300.

With continued reference to FIG. 1, the example architecture 100 may further include an appliance 500, such as the Dell EMC CloudBoost appliance for example, by way of which one or more clients 110 are able to communicate with storage 600, such as by way of uploading data to, and/or downloading data from, the storage 600. The storage 600 may include one or more instances of a filesystem 602 that catalogues files and other data residing in the storage 600.

The appliance 500 may provide a variety of useful functionalities. For example, some embodiments of the appliance 500 can provide source-side data deduplication, data compression, and WAN optimization boost performance and throughput while also possibly reducing the consumption and cost of network bandwidth and cloud storage capacity. As well, embodiments of the appliance 500 can be implemented in various forms, such as a virtual, physical, or native public cloud appliance to fit the requirements of a particular situation, and the appliance 500 can be used with various types of storage 600, including public and private object storage clouds. Finally, embodiments of the appliance 500 can provide data segmentation, as well as in-flight encryption as the data is sent by the appliance 500 to the storage 600. Data transfers between the appliance 500 and storage 600 can be effected with HTTPS. As used herein, HTTPS refers to communication over Hypertext Transfer Protocol (HTTP) within a connection encrypted by Transport Layer Security (TLS), or its predecessor, Secure Sockets Layer (SSL).

With continued reference to FIG. 1, the storage 600 can include any type or types of storage, examples of which include, but are not limited to, disk storage, solid state device (SSD) storage, and/or any other type of storage disclosed herein. In some cases, storage 600 can include a combination of magnetic and/or optical disk storage, and SSD storage, although no particular type of storage, or combination of storage types, is required by any embodiment of the invention. As well, the storage 600 can comprise, or consist of, one or more database servers. No particular storage type or configuration is required however.

B. Example Host Configuration

Figure 2:
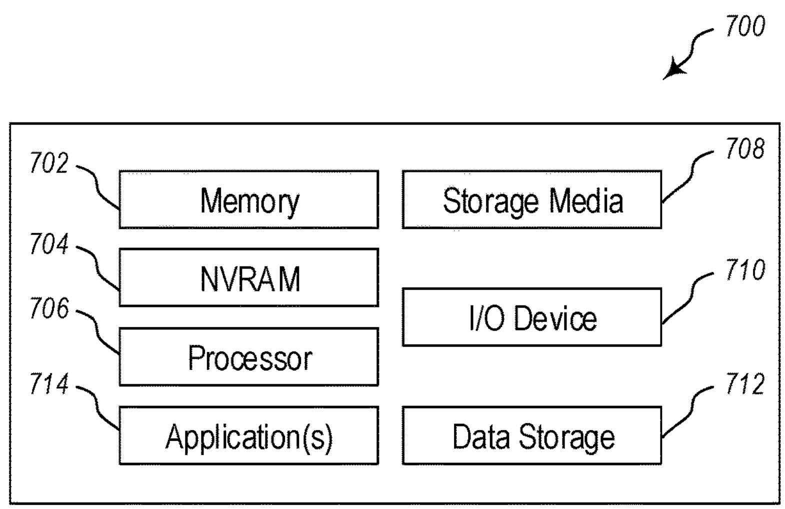
FIG. 2 discloses aspects of an example host configuration.

With reference briefly to FIG. 2, any one or more of the clients 110, MDS proxy 200, RPC client 300, MDS 400, appliance 500, and storage 600 can take the form of a physical computing device, one example of which is denoted at 700. Additionally, or alternatively, any one or more of the aforementioned entities can be implemented in the form of executable instructions. In the example of FIG. 2, the physical computing device 700 includes a memory 702 which can include one, some, or all, of random access memory (RAM), non-volatile random access memory (NVRAM) 704, read-only memory (ROM), and persistent memory, one or more hardware processors 706, non-transitory storage media 708, I/O device 710, and data storage 712. One or more of the memory components of the physical computing device can take the form of solid state device (SSD) storage. As well, one or more applications 714 are provided that comprise executable instructions. Such executable instructions can take the form, for example, of a backup/restore application, a backup/restore client, a client agent 114, an MDS proxy 200, an RPC client 300, an MDS 400, an appliance 500, and storage 600.

D. Aspects of Example Methods

Figure 3:
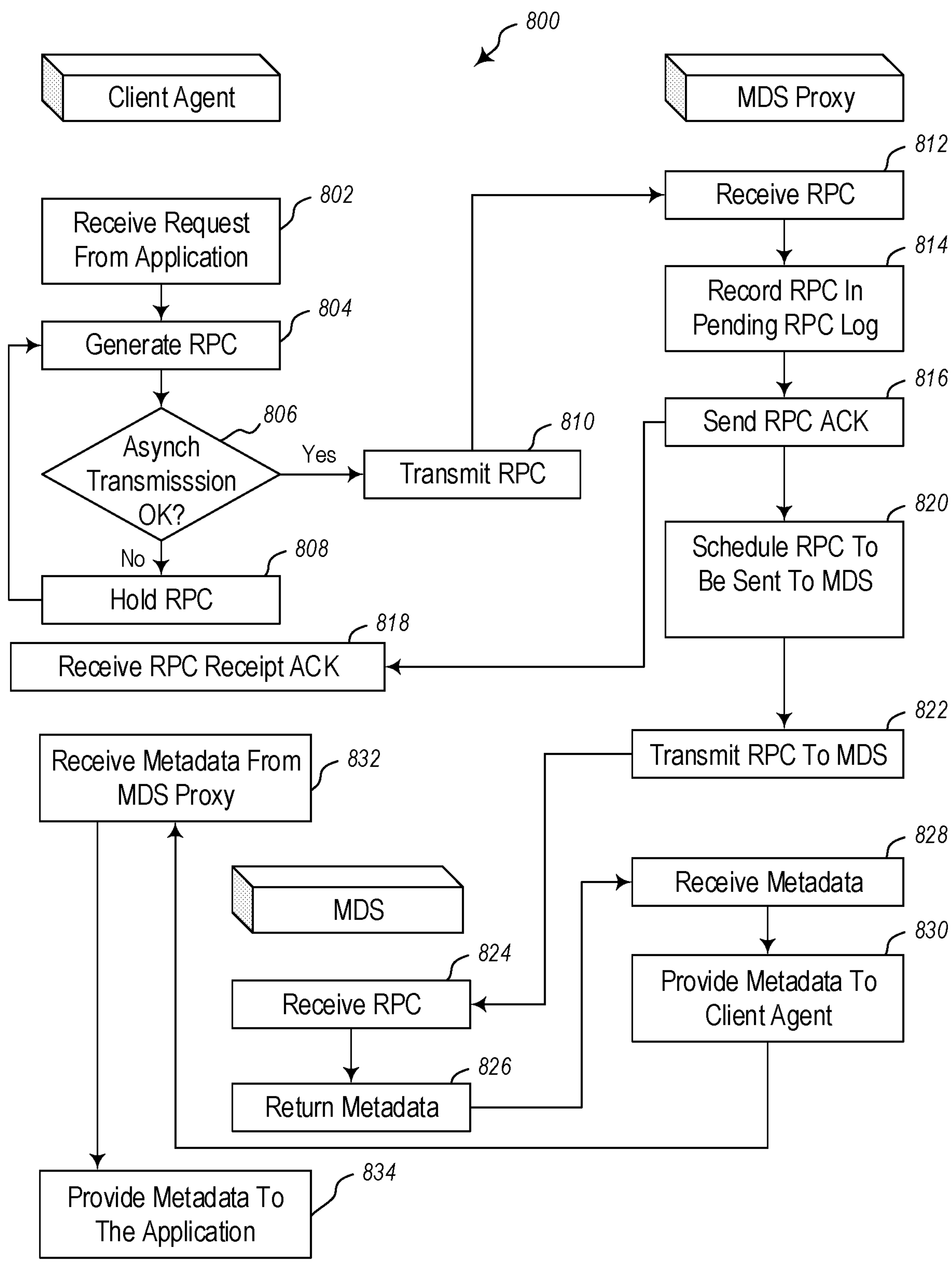
FIG. 3 discloses aspects of example methods for reducing perceived latency in communications between computing entities.

Directing attention now to FIG. 3, and with continued attention to FIGS. 1 and 2, details are provided concerning aspects of an example method involving the operation of a client agent and MDS proxy. In general, example methods within the scope of the invention can be performed in connection with one or more asynchronous remote procedure calls (RPC). An asynchronous RPC separates a remote procedure call from its return value. As such, the use of asynchronous RPC can enable a client agent to have multiple outstanding calls, since the client agent is not blocked in any RPC until the return value is received for that particular call. As another example, use of asynchronous RPC enables a client agent to initiate an RPC even if the client agent does not yet have all the data relating to the RPC because, for example, the client agent is slow to produce data relating to the RPC. Thus, the RPC can be initiated with incomplete data, and the incomplete data supplemented later as it is produced.

In one particular example embodiment, an architecture can take the form of a store-and-forward model. In this type of configuration, the RPC is first completed and registered in the MDS proxy, and then forwarded asynchronously to the MDS.

Another example of a possible benefit of the use of asynchronous RPC is that a server, such as an MDS, can start an operation that is asynchronous relative to a previously started operation and send back the reply to the subsequent operation when the reply is available, rather than having to wait for completion of the initial operation. That is, the server can send the reply incrementally as results become available for a particular request. In this way, a relatively slow server can be prevented from slowing down a client application.

As a final example, transferring relatively large amounts of data between a client and server, such as an MDS for example, can slow the operation of the client and/or server for the duration of the data transfer. However, the use of asynchronous RPC enables data transfer between the two entities to take place incrementally, without preventing either the client or server from performing other tasks.

With particular reference now to FIG. 3, one example of a method involving the operation of a client agent and MDS proxy is denoted generally at 800 and may be performed, for example, between a co-located client agent and MDS proxy. The method 800 can begin when an application receives a file system request, such as for a read or write operation concerning data associated with the application, and the requested operation necessitates the use of metadata which may be stored at an MDS. Thus, the client agent receives a request 802 from the application to obtain metadata relating to a process that will be performed by the application.

After receipt of the request, the client agent may generate a corresponding RPC 804 which may, among other things, identify the metadata needed to perform the operation(s) requested by the client. The client agent may, in some embodiments, perform a check 806 to determine if there are any impediments to an asynchronous transmission of the RPC. If impediments are identified, the RPC can be held 808 by the client agent until those are resolved. On the other hand, if there are no impediments to RPC transmission, the client agent can transmit the RPC 810, which is then received 812 by the MDS proxy.

In more detail, and with regard to the inquiry 806, the client agent may employ a mechanism, one example of which is sometimes referred to as a "file lease," to determine whether a metadata operation can be processed in an asynchronous manner. In brief, if a client is the only one accessing a subdirectory in the share, that client is granted an "exclusive" lease, which the client holds until a second client tries to access the same subdirectory. While the client holds the exclusive lease, that client is permitted to perform metadata operations in an asynchronous manner. Further, the same checks can be made on the client (following certain algorithms per operation type—for example, open existing file, change file permissions, and others) that the server makes, ensuring that if one metadata operation is successful on the client, there is assurance that when the corresponding RPC is sent to the server, the metadata operation will succeed at the server as well. This same notion holds true for failed metadata operations, that is, if a metadata operation fails at the client, it can be concluded that the metadata operation will also fail on the server.

With continued reference now to FIG. 3, after the MDS proxy receives the RPC from the client agent 812, the MDS proxy may log 814 the RPC in a pending RPC log. At this point, the MDS proxy may immediately respond back to the client agent acknowledging that the RPC has been received and logged, and the client agent receives the acknowledgement at 818. Thus, since the client agent does not need to wait for the acknowledgement until after the RPC has been sent to the MDS and the response has been received, the perceived latency for the filesystem operation that was initially requested of the application is that between the client agent and the MDS proxy. That is, the perceived latency is the time that has elapsed between transmission of the RPC 810 by the client agent and receipt 818, by the client agent from the MDS proxy, of the RPC acknowledgement.

This latency is the latency perceived by the application that requested the metadata operation corresponding to the RPC, and may also be perceived by a user of the application as well.

In addition to providing an RPC acknowledgement 816 to the client agent, the MDS proxy also schedules 820 the RPC for transmission to the MDS. The RPC can be transmitted to the MDS asynchronously relative to one or more other RPCs that were previously, or subsequently, scheduled relative to the RPC. When the scheduled time has arrived, the RPC can be transmitted 822 to the MDS, such as by way of an RPC proxy for example, and received 824 by the MDS. Upon receipt 824 of the RPC, the MDS can communicate with storage to obtain and package the metadata implicated by the RPC and then return 826 that metadata to the MDS proxy.

After receipt 828 of the metadata from the MDS, the MDS proxy can then return 830 that metadata to the client agent that originated the corresponding RPC. This metadata is received 832 by the client agent. The client agent can then provide 834 the metadata to the application to which the initial filesystem request was made. The application can then use the metadata to fulfill a requested operation, such as a read or write operation for example, concerning application data that is stored, or will be stored, in storage. Such read and write operations can be elements of a backup and/or restore process, and the backup process can involve data deduplication prior to backing up of the data in storage.

E. Example Code Structure

With the example processes disclosed in FIG. 3 in view, aspects of the behavior for example implementations of the MDS proxy, such as MDS proxy 200 for example, and the client agent, such as client agent 114 for example, is described in the following pseudocode.

```
[client agent]
sendRpc(rpc) {
    response = mdsProxy.sendAndWait(rpc);
    if (rpc.canSendAsynchronously( )) {
        // for asynchronous ops, the MDS proxy sets the op status
        // to PENDING; the actual response will be received in
        // the future and is assumed to be successful
        assert(response.status == PENDING);
        // record operations whose final response is pending
        pendingRpcs.add(rpc);
    }
    return response;
}
[MDS proxy]
processRpc(rpc) {
    if (rpc.cancanSendAsynchronously( )) {
        // record all RPCs that we've pended
        pendedRpcs.add(rpc);
        // return instantly with PENDING status
        response.status = PENDING;
        return response;
    } else {
        // cannot send the RPC asynchronously, need to block
        // until it has been processed by the MDS
        response = mds.sendAndWait(rpc);
        client.sendSyncResponse(response);
    }
}
drainPendedRpcs( ) {
    while(true) {
        if (!pendedRpcs.empty( )) {
            response = mds.sendAndWait(pendedRpcs.pop( ));
            client.sendAsyncResponse(response);
        }
    }
}
```

F. Example Computing Devices And Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein.

As indicated above, embodiments within the scope of the present invention also include computer storage media, which are physical media for carrying or having computer-executable instructions or data structures stored thereon. Such computer storage media can be any available physical media that can be accessed by a general purpose or special purpose computer.

By way of example, and not limitation, such computer storage media can comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which can be used to store program code in the form of computer-executable instructions or data structures, which can be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' can refer to software objects or routines that execute on the computing system. The different components, modules, engines, and services described herein may be implemented as objects or processes that execute on the computing system, for example, as separate threads. While the system and methods described herein can be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or other machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:

performing, with a client agent, operations comprising:

receiving a metadata request from an application;

generating a remote procedure call (RPC) that identifies metadata requested by the application;

performing, after the RPC is generated, a check to determine if asynchronous transmission of the RPC to a metadata server (MDS) proxy can proceed;

transmitting the RPC to the metadata server (MDS) proxy;

receiving, from the MDS proxy, an acknowledgement that the RPC has been received and logged;

receiving metadata identified in the RPC; and providing the metadata to the application.

2. The method as recited in claim 1, wherein the metadata request concerns an operation to be performed by the application.

3. The method as recited in claim 1, wherein the operations further comprise:

asynchronously transmitting the RPC to the MDS proxy when it is determined that there is no impediment to such transmission; or holding the RPC when it is determined that there is an impediment to asynchronous transmission of the RPC.

4. The method as recited in claim 1, wherein a file lease mechanism is used to determine if asynchronous transmission of the RPC to the MDS proxy can proceed.

5. The method as recited in claim 1, wherein the metadata is received from an MDS by way of the MDS proxy.

6. The method as recited in claim 1, wherein a latency perceived by the application is an amount of time that has elapsed between transmission of the RPC to the MDS proxy, and receipt of the acknowledgement from the MDS proxy.

7. The method as recited in claim 1, wherein the operations further comprise exposing a file system interface to the application.

8. The method as recited in claim 1, wherein the RPC is initiated with incomplete data.

9. The method as recited in claim 1, wherein the RPC is an asynchronous RPC.

10. A non-transitory storage medium having stored therein instructions that are executable by one or more hardware processors to:

perform, with a client agent, operations comprising:

receiving a metadata request from an application;

generating a remote procedure call (RPC) that identifies metadata requested by the application;

performing, after the RPC is generated, a check to determine if asynchronous transmission of the RPC to a metadata server (MDS) proxy can proceed;

transmitting the RPC to the metadata server (MDS) proxy;

receiving, from the MDS proxy, an acknowledgement that the RPC has been received and logged;

receiving metadata identified in the RPC; and providing the metadata to the application.

11. The non-transitory storage medium as recited in claim 10, wherein the metadata request concerns an operation to be performed by the application.

12. The non-transitory storage medium as recited in claim 10, wherein the operations further comprise:

asynchronously transmitting the RPC to the MDS proxy when it is determined that there is no impediment to such transmission; or holding the RPC when it is determined that there is an impediment to asynchronous transmission of the RPC.

13. The non-transitory storage medium as recited in claim 10, wherein a file lease mechanism is used to determine if asynchronous transmission of the RPC to the MDS proxy can proceed.

14. The non-transitory storage medium as recited in claim 10, wherein the metadata is received from an MDS by way of the MDS proxy.

15. The non-transitory storage medium as recited in claim 10, wherein a latency perceived by the application is an amount of time that has elapsed between transmission of the RPC to the MDS proxy, and receipt of the acknowledgement from the MDS proxy.

16. The non-transitory storage medium as recited in claim 10, wherein the operations further comprise exposing a file system interface to the application.

17. The non-transitory storage medium as recited in claim 10, wherein the RPC is initiated with incomplete data.

18. The non-transitory storage medium as recited in claim 10, wherein the RPC is an asynchronous RPC.

19. A system, comprising:

one or more hardware processors; and a non-transitory storage medium having stored therein instructions that are executable by the one or more hardware processors to:

perform, with a client agent, operations comprising:

receiving a metadata request from an application;

generating a remote procedure call (RPC) that identifies metadata requested by the application;

performing, after the RPC is generated, a check to determine if asynchronous transmission of the RPC to a metadata server (MDS) proxy can proceed;

transmitting the RPC to the metadata server (MDS) proxy;

receiving, from the MDS proxy, an acknowledgement that the RPC has been received and logged;

receiving metadata identified in the RPC; and providing the metadata to the application.

20. The system as recited in claim 19, wherein the operations further comprise:

asynchronously transmitting the RPC to the MDS proxy when it is determined that there is no impediment to such transmission; or holding the RPC when it is determined that there is an impediment to asynchronous transmission of the RPC.

* * * * *